Figure 1:
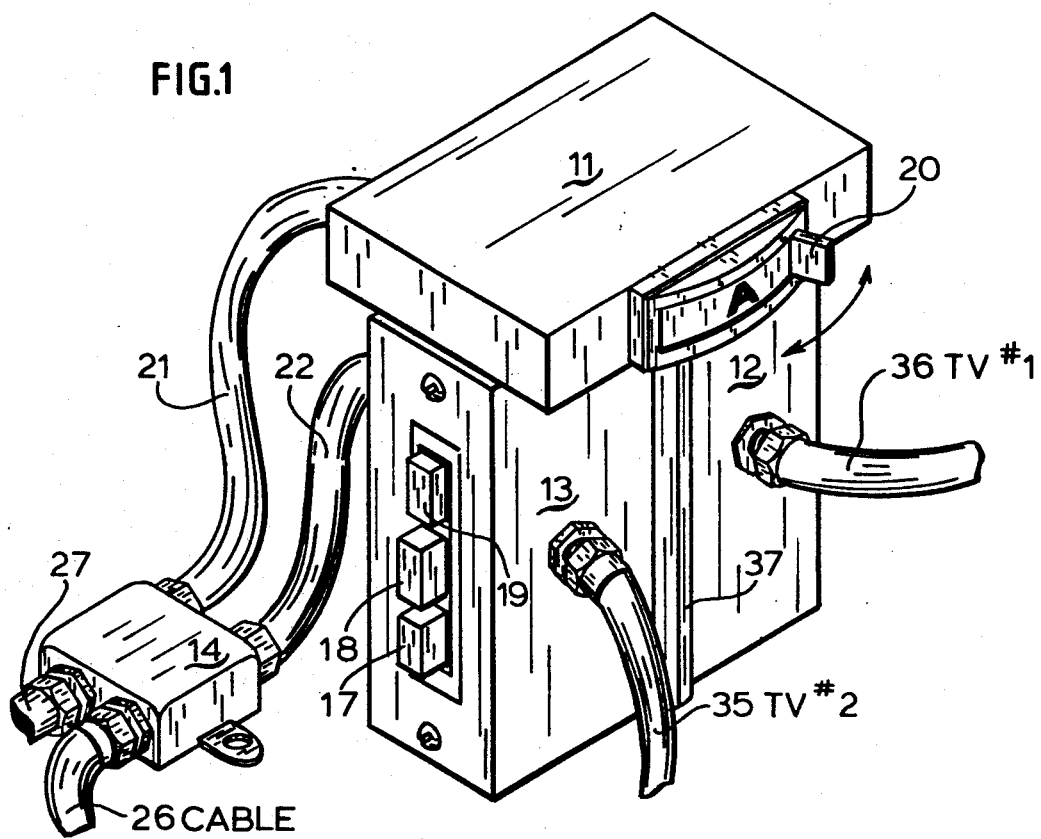

United States Patent [19]
Stewart et al.

[11] 4,276,562
[45] Jun. 30, 1981

[54] TV SWITCHING SYSTEM

[76] Inventors: Mark Stewart; Lynn Stewart, both of 30 Park Ave., New York, N.Y. 10016

[21] Appl. No.: 135,752

[22] Filed: Mar. 31, 1980

[51] Int. Cl.³ .................. H04N 5/782; H04N 7/16
[52] U.S. Cl. ............................. 358/86; 358/127; 358/181; 358/188; 455/3; 455/344; 369/7
[58] Field of Search ............... 179/100.11, 100.1 PS; 360/14; 455/3, 133, 140, 344; 358/86, 181, 188, 189, 127

[56] References Cited
U.S. PATENT DOCUMENTS

| | | | |
|---|---|---|---|
| 2,983,795 | 5/1961 | Tateishi et al. | 179/100.11 |
| 3,484,548 | 12/1969 | Kowal et al. | 179/100.11 |
| 3,914,534 | 10/1975 | Forbes | 358/86 |
| 3,922,641 | 11/1975 | Gates, Jr. | 455/143 |

*Primary Examiner*—Marc E. Bookbinder
*Attorney, Agent, or Firm*—Allison C. Collard; Thomas M. Galgano

[57] ABSTRACT

A switching system for interconnecting various TV sources, such as a subscription television source, a house antenna and a video recorder to a plurality of TV sets, consisting of a switch having a plurality of pushbuttons and having an input for coupling to each of said TV sets and having each of its outputs responsive to a pushbutton for connection to the video recorder, subscription television source and the house antenna. There is also a single-throw switch having its input for coupling to the input of the video recorder and each of its outputs for coupling to the subscription television source and the house antenna. The pushbutton switches are preferably three-way switches having inputs for connection to each television set and at least three pushbuttons for controlling the three signal sources. There are also signal splitters having inputs for connection to the subscription television source, the house antenna or the video recorder, and outputs connected to the outputs of the three-way switches.

5 Claims, 2 Drawing Figures

U.S. Patent   Jun. 30, 1981   4,276,562

TV SWITCHING SYSTEM

This invention relates to a multiple switching system for use with home entertainment systems.

More specifically, this system relates to a multiple switching system, which is capable of interconnecting a television antenna, a subscription or pay television station, a video game, a plurality of TV sets and a video recorder, for home entertainment use.

When television was first introduced, it was a simple matter of connecting a TV set up to a house antenna and directing the antenna to the nearest TV station for reception. Television home entertainment reception has now become more sophisticated, with the introduction of cable or pay television and with the use of video recorders. It is now desirable to interconnect all of these systems together with a plurality of television receivers, so that it would be possible to receive programs from the house antenna, the cable subscription network or the video recorder, on one or more TV sets. Moreover, it is also desirable to be able to simultaneously record stations on the video recorder from either the house antenna or the pay television station. With video recorders, such as SONY's "BETAMAX" and RCA's "SELECTAVISION", it has become desirable to record programs on videotape from either pay television or from the house antenna, while viewing either the same program or another program, during the recording. Moreover, with two or more television sets, it has become desirable to provide different programs on each set to suit the individual's tastes, wherein the programs can be derived from either the house antenna, the pay television antenna, video games, the video recorder or any other video source. At the present time, subscribers who have these components, must change the cables or wiring at the back of their sets to manually connect to the desired program coming off the house antenna, pay television or video recorder. Moreover, if a particular station is to be recorded, the input of the recorder has to be manually connected to the input of either the pay television, the video game or the house antenna. With the large number of inputs and outputs and wires coming off two or more TV sets, the house antenna, the pay TV and the input and outputs of the video recorder, the TV user can become quite confused in attempting to quickly interconnect the proper sequence of cables as TV programs change hour to hour.

Most subscription or pay television services provide the user with a decoding box, which is tunable to a variety of different subscription channels. The output of the subscription or pay TV box provides a signal on a fixed channel frequency, such as one of the unused channels in the local area. Thus, the only way to change stations on the subscription or pay TV service is to manually change the selector in the decoding box provided by the service. In this manner, for television sets that are provided with remote controls that automatically change the channels of the TV set itself, the remote control is useless when the set is tuned to the subscription TV, since the set must be tuned to the single selected, unused channel to receive the subscription service.

In a similar manner, the video recorders are often provided with a programming feature which allows the owner to program the machine to record different programs on different channels during different periods of time in the week. When the video recorder is connected to the television house antenna, the machine can be programmed to selected different channels. However, when it is connected to the subscription or pay TV, it can only record the fixed channel, which is selected manually on the subscription set, and, therefore, its ability to select programming on different channels is limited.

The switching system of the present invention, however, permits the TV sets to be easily switched from the subscription or pay TV service, so that the remote control units of the TV set can be used when the sets are connected to the house antenna. In a similar manner, the system, according to the invention, allows switching of the video recorder off the pay TV or subscription channel, to the house antenna, so that the timer of the video recorder can be used to select programming from different channels during different parts of the week.

Accordingly, the present invention provides a switching system which couples the outputs of at least two television sets, the pay TV, house antenna and video recorder, as well as the input to the video recorder, into a central switching system, so that it is possible by depressing one or more buttons, to connect one or both TV sets to any combination of outputs for programming.

In its simplest form for operating with two television receivers, the system employs a pair of three-way push-button switches, a single-throw coaxial switch, two three-way signal splitters, a two-way signal splitter and a plurality of interconnecting coaxial cables, which connect the switches and the signal splitters to the two television sets, the house antenna, the pay TV antenna and the input and outputs of the video recorder. Thus, it is possible, with the proper connection of the components to the switching system of the invention, to provide a wide variety of combinations of TV viewing.

Therefore, it is an object according to the present invention to provide a switching system which is capable of interconnecting a plurality of TV sets with at least two antenna system and a video recorder, for providing a multitude of reception combinations.

It is another object according to the present invention to provide a switching system for interconnecting a plurality of TV sets to various signal sources, which is simple in design, easy to operate and inexpensive in cost.

Other objects and features of the present invention will become apparent from the following detailed description considered in connection with the accompanying drawing, which discloses the embodiments of the invention. It is to be understood that the drawing is designed for the purpose of illustration only, and not as a limitation to the invention.

Figure 2:
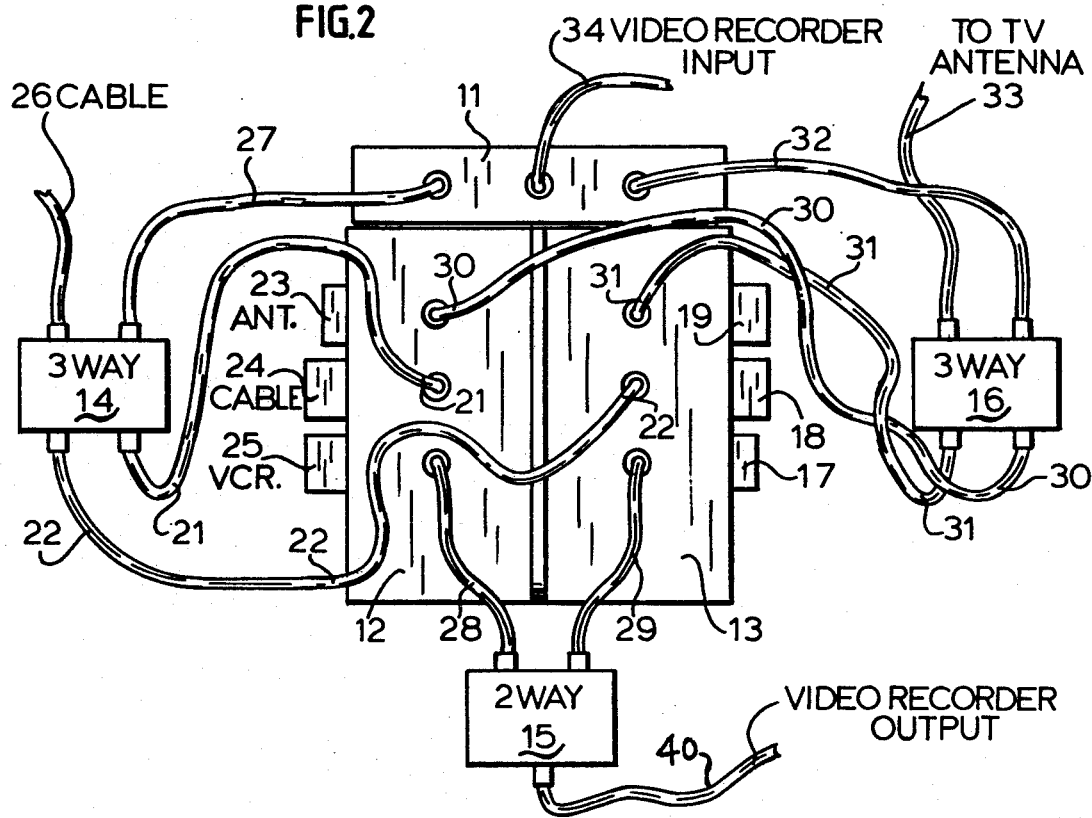

In the drawing, wherein similar reference characters denote similar elements throughout the two views:

FIG. 1 is a perspective view, slightly in elevation of a portion of the switching system, according to the invention; and FIG. 2 is a more detailed view of the switching system of the invention, showing the interconnections to the various components of the system.

Referring to FIGS. 1 and 2, there is shown a first three-way push-button switch 12 and a second three-way push-button 13 and a single-throw coaxial switch 11. Switches 12 and 13 are each provided with buttons 23, 24 and 25 and 19, 18 and 17. Switches 12 and 13 are preferably manufactured by Philmore Company and are identified as their VRT/TV Selector Switches CS-4.

Switch 13 is designed so that only one of the three buttons 17, 18 or 19 can be depressed at one time, so as to connect input 35 to only one of the three outputs 31, 22 or 29 at the back of the switch. Switch 12 works in a similar manner. In other words, as shown in detail in FIG. 2, with button 23 depressed on switch 12, input 36 will be connected to output 30. There will be no connection on input 36 to outputs 21 or 28. Likewise, outputs 21 and 28 are isolated from one another. If button 24 is depressed, input 36 will be connected to output 21, and, likewise, if button 25 is depressed, input 36 will be connected only to output 28. The remaining buttons assume an undepressed position in a manner similar to pushbutton radio.

Switch 11 is preferably a coaxial switch and, in the particular embodiment shown, an Arvin Coaxial Switch which is more fully described in U.S. Pat. No. 3,940,584, issued on Feb. 24, 1976, was chosen. Switch 11 is a two-position coaxial switch and in FIG. 1 is shown having its switch-button thrown to the right-hand side. (A position) On the back of the switch, as shown in FIG. 2, this will connect cable 34 to cable 32. Likewise, if selector 20 is thrown to the left from its "A" position to its "B" position, it will connect cable 34 to cable 27.

All three switches and the cables are preferably designed to have an internal impedence of 70 ohms, which corresponds to the cable impedance of ordinary television transmission. The cables are shown connected to either three-way splitters 14 or 16 or a two-way splitter 15.

Referring now in detail to FIG. 2, the center terminals of three-way pushbutton switches 12 and 13 are each connected to cables 12 and 22, which are fed into two of the output terminals of three-way splitter 14. The third output terminal is connected through cable 27 to one leg of single-throw switch 11. The input of three-way switch 14 is connected through cable 26 to the subscription or pay TV cable.

The upper terminals of three-way switches 12 and 13, which are responsive to pushbuttons 23 and 19, are connected through cables 30 and 31, to the output of three-way splitter 16. Another output of three-way splitter 16 is connected through cable 32 to the other side of single-throw switch 11. The input to three-way splitter 16 is connected to the house TV antenna through cable 33.

The lower terminals of three-way switches 12 and 13, which are responsive to pushbuttons 25 and 17, are connected through cables 28 and 29, respectively, to two-way switch 15. The input to two-way switch 15 is connected to the output of the video recorder. Thus, videotapes played on the recorder, will provide video signals through cable 40 to the input of two-way splitter 15.

The video recorder also has an input connection, which is preferably connected to cable 34, which is connected to the centerpole terminal of single-throw switch 11. On the front of switch 12 is a connection for cable 36 to the first television set, labelled TV #1. Likewise, on the front of switch 13 is a connection for cable 35, to go to TV set #2. The two-way or three-way splitter switches 14, 15 or 16 are usually resistive networks, which are designed to maintain input and output impedences of 75 ohms at each of its terminals, and may be readily purchased at any electronic supply store. Switches 12 and 13, as shown in FIG. 1, are preferably joined together at their backs by securing together their rear flanges 37. Switch 11 is preferably secured to the top of switches 12 and 13 by a double-sided contact tape. It is obvious that the apparatus could also be mounted in a cabinet, so that the splitters and interconnections are concealed, and only the inputs and outputs are connected to the back or front of the cabinet.

There are a large number of connection combinations of TV viewing possible with the switching system of the present invention, the connection combinations are as follows:

1. To connect both TV's on cable 35 and 36 to the house TV antenna on cable 33, buttons 19 and 23 on switches 13 and 12 are depressed. This connects both TV's through cables 31 and 30 to three-way splitter 16, which is connected to the house antenna via cable 33.

2. To now connect TV #1 to the video recorder, button 25 is depressed, so that TV #1 is connected via cable 28 to two-way splitter 15, which is receiving its signal from cable 40, from the video recorder.

3. Both TV's can obviously be connected to the recorder if pushbutton 17 is depressed.

4. Both TV's can be connected to the subscription or pay TV if pushbuttons 18 and 24 are depressed in switches 13 and 12. In this case, both TV's are connected through cables 21 and 22 to three-way splitter 14, which has its input connected to cable 26.

5. It is possible to connected one of the TV's in connection #4 to the video recorder by depressing button 17, allowing button 18 to assume its undepressed position.

6. In another selection, one TV can be connected to the pay TV channel by depressing button 24 of switch 12, while the other TV can be connected to the house antenna by depressing button 19 of switch 13.

The input to the recorder connected to cable 34 can be connected to the house antenna on cable 33 by throwing single-throw switch 11 into position "A", as shown in FIG. 1. In this instance, cable 32, which is another output of three-way splitter 16 that is connected to the house antenna, will feed one leg of switch 11, so that the output of the switch will be connected to the input of the video recorder for recording purposes. In the meantime, both TV's can be independently switched to view the programs coming in on the house antenna or the subscription TV, or both.

The video recorder input can also be connected to the pay TV cable by throwing single-pole switch into position "B", so that the recorder is connected through switch 11 to cable 27 and through three-way splitter 14 to pay TV cable 26. In a similar manner, both TV's are capable of viewing programs coming in on either the house antenna or the cable, while the video recorder records the program.

During all of these selections, no cables had to be disconnected from the system, and all of the selections were made by merely activating pushbuttons 17, 18, 19, 23, 24, 25 and switch arm 20.

In order to add a third TV set to the system, it is necessary only to provide an additional three-way switch 12 or 13 and provide an additional output to each of splitters 14, 15 and 16, so that two four-way and one three-way splitter would be used.

It would also be possible to add a fourth pushbutton switch to each of switches 12 and 13, with a fourth input located below cables 28 and 29, which would be connected to an additional two-way splitter. The remaining terminal of the two-way splitter in a manner similar to splitter 15, could be connected to an additional video source, such as a TV game, a video disc player or the output from a computer, where one or more of the TV sets is to be used as the viewing screen for the computer.

The ends of the various cables can use any standard connectors which are compatible with the switches shown. Most TV switches provide terminals with TNC fittings, which provide the proper shielding of the center conductor.

While only several embodiments of the present invention have been shown and described, it will be obvious to those persons or ordinary skill in the art, that many changes and modifications may be made thereunto, without departing from the spirit and scope of the invention.

What is claimed is:

1. A switching system for interconnecting various TV sources, such as a subscription television source, a house antenna and a video recorder, to a plurality of TV sets, comprising:
    first switch means having a plurality of inputs, a plurality of pushbuttons, a plurality of outputs coupled to respective ones of said TV sets, and having each of its outputs coupled to one of said video recorder, subscription television source and house antenna via respective ones of said inputs in response to activation of a respective one of said pushbuttons; and
    second switch means having an output thereof coupled to an input of the video recorder and a pair of inputs coupled, respectively, to the subscription television source and the house antenna.

2. The switching system as recited in claim 1, wherein said first switch means comprises a first three-way switch having an output for connection to a first television set and three pushbuttons controlling three inputs, and a second three-way switch having an output for connection to a second television set and three pushbuttons controlling three inputs;
    first coupling means having an input for connection to the subscription television source and a pair of outputs connected to a first input of each first and second three-way switch;
    second coupling means having an input for connection to the house antenna and a pair of outputs connected to a second input of each first and second three-way switch;
    third coupling means having an input for coupling to the video recorder output and a pair of outputs connected to a third input of each first and second three-way switch.

3. The switching system as recited in claim 2, wherein said first and second couplers are three-way signal splitters and said third coupler comprises a two-way signal splitter.

4. The switching system as recited in claim 3, wherein each of said three-way signal splitters includes an output coupled to one terminal of said second switch means.

5. The switching system as recited in claim 4, wherein said second switch comprises a single-throw coaxial switch having an output for connection to the video recorder input, and having two inputs for coupling to the subscription television source and the house via said first and second coupling means, respectively.

* * * * *